Oct. 7, 1930.                S. W. NELDNER                1,777,529
                              RACK SUPPORT
                          Filed Sept. 23, 1929
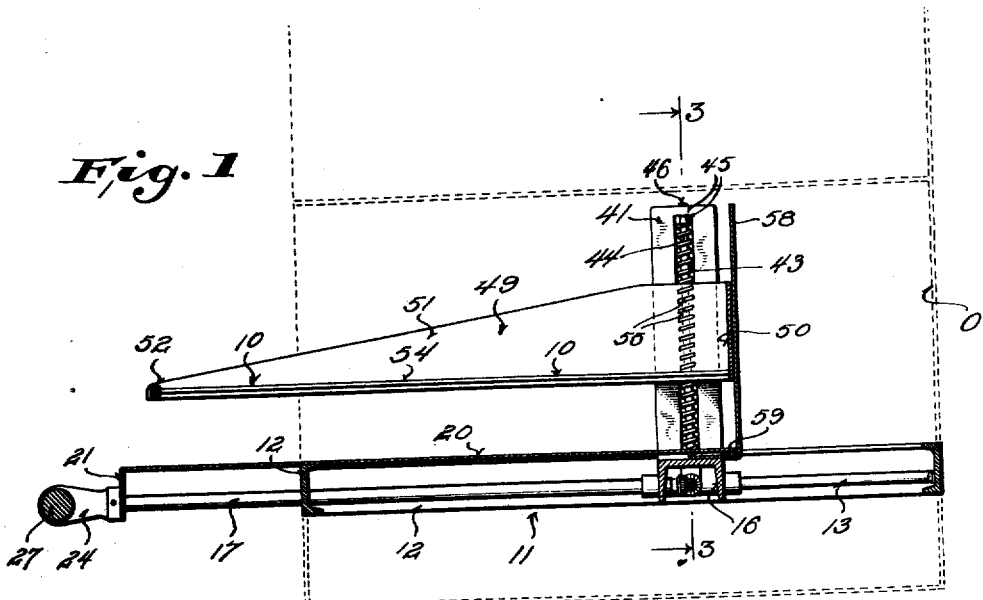
Fig. 1
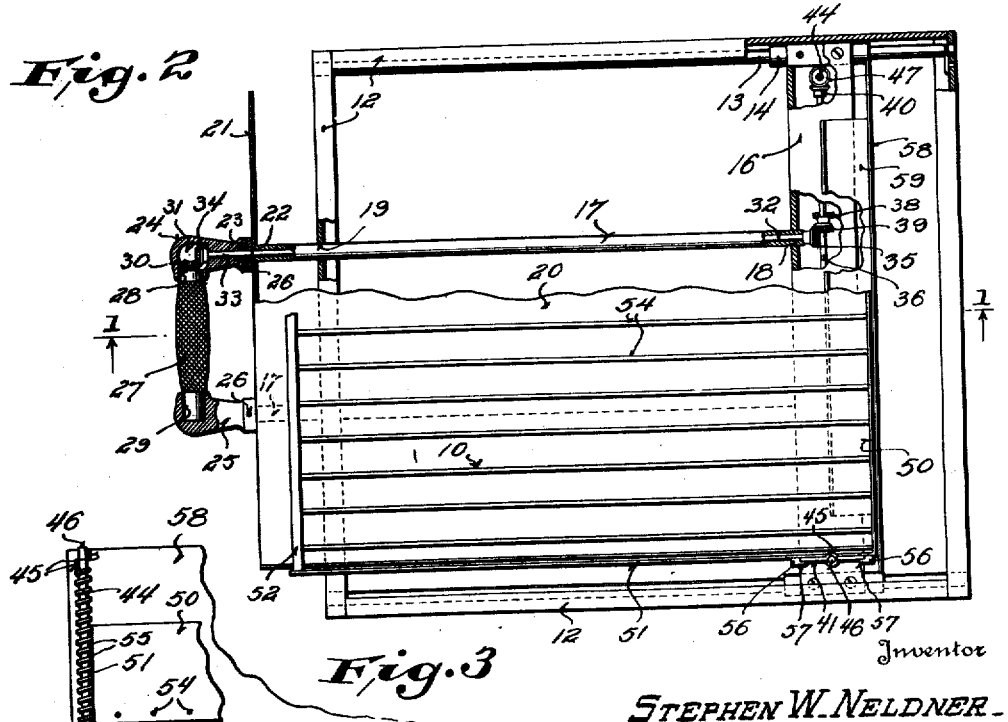
Fig. 2
Fig. 3
Inventor
STEPHEN W. NELDNER
By
Attorney Patented Oct. 7, 1930

1,777,529

UNITED STATES PATENT OFFICE

STEPHEN W. NELDNER, OF MILWAUKEE, WISCONSIN

RACK SUPPORT

Application filed September 23, 1929. Serial No. 394,632.

This invention relates to adjustable racks for ovens and the like.

One object of the present invention is the provision of an adjustable rack support of simple and economical design which may be readily installed as a unit within an oven or the like.

Another object is the provision of a unitary control for adjustable rack supports operable to effect either a vertical or horizontal adjustment of the rack by movement of a single control element.

Other objects and advantages will appear from the following description of an adjustable rack support constructed in accordance with the present invention.

In the accompanying drawings:—

Figure 1 is a vertical sectional view of an adjustable rack support embodying the present invention. This view is taken along the line 1—1 of Fig. 2.

Fig. 2 is a top plan view with parts broken away.

Fig. 3 is a fragmentary sectional view taken substantially along the line 3—3 of Fig. 1.

The rack support shown is supported upon a rectangular base frame 11 adapted to be suitably fixed in horizontal position within an oven O of conventional design. The base frame in this instance is made up of channel bars 12 secured together by welding or otherwise. A cross-member 16 in the form of an inverted channel bar is mounted for horizontal travel longitudinally of the base frame 11. The cross-member 16 is supported by a pair of blocks 14 fixed to the opposite ends thereof and apertured, as at 15, to slidably receive a pair of supporting guide rods 13 which are fixed within the base frame adjacent and paralleling the side bars thereof.

A pair of parallel tubular members 17, anchored at their rear ends in apertures 18 in the member 16, extend forwardly therefrom through apertures 19 in the front bar of the base frame which supports and guides the tubular members. The ends 23 of the tubular members 17 project through apertures 22 formed in the downturned flange 21 of a horizontal plate 20, which is thus supported at its forward edge. The plate also rests upon the front bar 12 of the base frame and at its rear edge is fixed to and supported by the cross-member 16. A pair of brackets, removably fixed to and upon the reduced ends 23 of the tubular members 17 by set screws 26, support a handle 27 which is journaled at its opposite ends in sockets 28 and 29 in the brackets. A bevel gear 30 on this handle meshes with a bevel gear 34 on a shaft 32 which extends from the bracket 24 through one of the tubular members 17 to the cross-member 16. A gear 35 on the rear end of this shaft meshes with and drives a gear 39 fixed to a shaft 36 which extends longitudinally of the cross-member 16 and is journaled in appropriate brackets 38 fixed to the member and also in appropriate apertures 37 formed in the blocks 14.

The cross-member 16 constitutes the base of an upright frame comprising two vertical plates 41 each of which has a lower end flange 42 fixed to the member 16 beneath the plate 20. Each plate 41 is longitudinally slotted to accommodate a vertical feed screw 44. The upper unthreaded end 46 of each screw is journaled in a suitable bearing, formed by stamping out adjacent narrow portions 45 of the plate 41 in opposite directions. Each screw 44 rests upon the cross-member 16 which is apertured to receive the unthreaded lower extremity thereof. Both screws 44 are simultaneously actuated from the shaft 36 through gears 40 which mesh with gears 48 fixed to the lower ends of the respective screws.

A horizontal frame 49 is mounted for vertical adjustment between the vertical plates 41 of the upright frame. This horizontal frame is formed of sheet metal bent to form two parallel side arms 51 connected by an integral rear member 50. Guide strips 56 fixed to each side arm 51 coact with the vertical edges of the associated plate 41 to retain the frame in horizontal position. Each side arm 51 contains a vertical series of diagonal slots 55 for receiving the convolutions of the adjacent screw 44 by which the frame is actually supported. A cross-bar 52 fixed to and connecting the forward ends of the side arms 51 completes the horizontal frame. The cross-bar 52 cooperates with the rear member 50 to support a series of longitudinal rods 54 which together form a rack or grill 10 for receiving foodstuffs.

It will be noted that by a pull or push on the handle 27 cross-member 16, together with the horizontal frame 49, may be advanced or retracted to thereby project the rack 10 from the oven or to retract the same thereunto, and that by rotation of the handle both screws 44 may be simultaneously rotated to raise or lower the horizontal frame 49 and rack 10.

Various changes may be made in the embodiment of the invention hereinabove specifically described without departing from or sacrificing the advantages of the invention as defined in the appended claims.

I claim:—

1. An adjustable rack support for ovens and the like comprising a base frame for mounting in an oven, a pair of parallel supports fixed in said base frame, an upright frame movable lengthwise of and on said supports, a horizontal frame vertically adjustable on said upright frame, a means for moving said upright and horizontal frames as a unit lengthwise of said supports and for raising and lowering said horizontal frame.

2. In an adjustable rack support for ovens and the like the combination with an enclosure, of a horizontal support therein, an upright frame movable lengthwise of said support, a horizontal frame vertically adjustable on said upright frame, a handle outside of said enclosure for moving said upright frame along said support, and means responsive to rotation of said handle for raising and lowering said horizontal frame.

3. In an adjustable rack support for ovens and the like the combination with an enclosure, of an upright frame movable horizontally in said enclosure, a horizontal frame vertically adjustable on said upright frame, a pair of rods connected with the base of said upright frame intermediate the ends thereof, said rods extending exteriorly of said enclosure, a handle carried by the exposed ends of said rods for moving said upright frame, and means responsive to rotation of said handle for raising and lowering said horizontal frame.

4. An adjustable rack support comprising an upright frame, a horizontal frame guided for vertical movement on said upright frame, said horizontal frame having sheet metal side arms, a vertical series of inclined slots in each side arm, a pair of vertical screws carried by said upright frame respectively engaged with said series of slots in said arms, and means for simultaneously rotating said screws to thereby raise or lower said horizontal frame.

In witness whereof, I hereunto subscribe my name this 22 day of August, 1929.

STEPHEN W. NELDNER.